Oct. 28, 1969  R. W. BULLARD  3,475,614
FILM IMAGE COMPRESSION AND READER
Filed Aug. 2, 1967
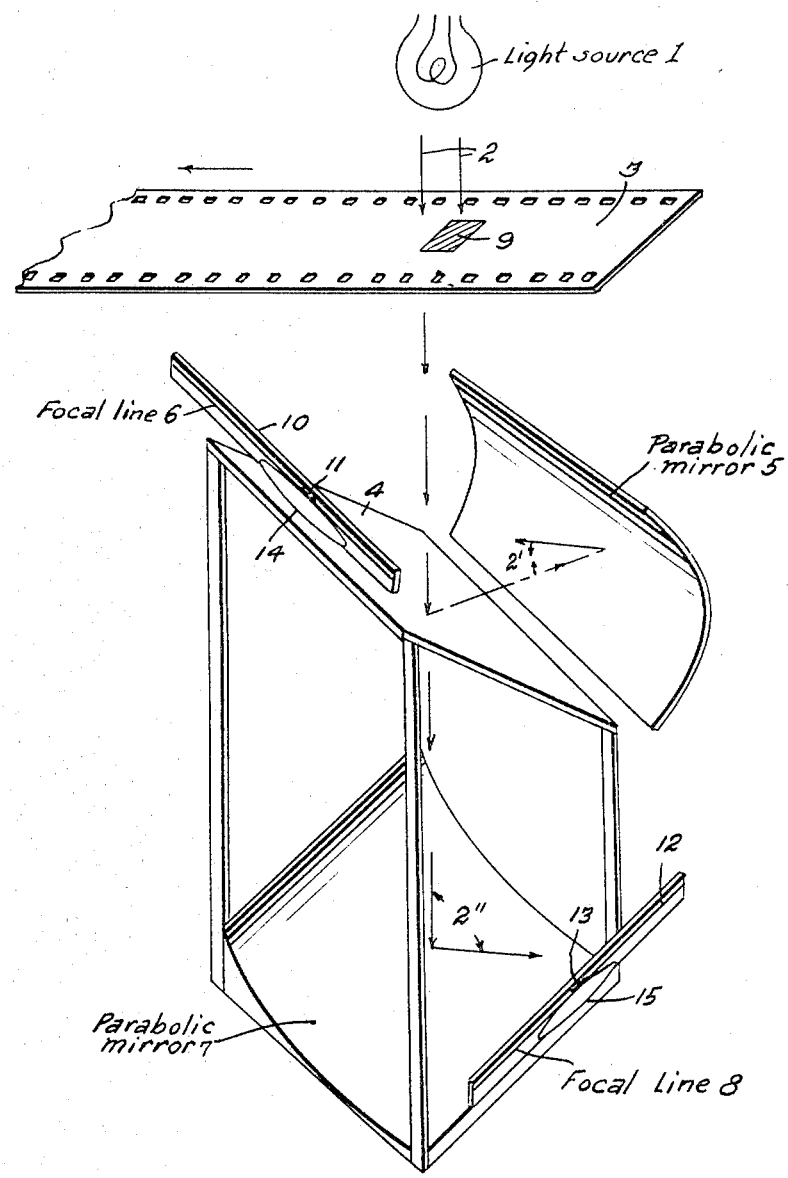
INVENTOR,
Richard W. Bullard
BY: Harry M. Saragovitz,
Edward J. Kelly, Herbert Berl &
R. P. Gibson  ATTORNEYS.

United States Patent Office 3,475,614
Patented Oct. 28, 1969

3,475,614
FILM IMAGE COMPRESSION AND READER
Richard W. Bullard, Las Cruces, N. Mex., assignor to the United States of America as represented by the Secretary of the Army
Filed Aug. 2, 1967, Ser. No. 658,010
Int. Cl. G03b 21/00
U.S. Cl. 250—219   7 Claims

ABSTRACT OF THE DISCLOSURE

This invention relates to a film reader which eliminates scanning of X and Y coordinate values. Primary light beams are passed through the film, divided by a beam splitted and the components are reflected by parabolic cylindrical mirrors to lines of light, with dark areas representing the X and Y coordinate values of an image on the film. Customary light scanning of the film is eliminated.

---

The invention described herein may be manufactured, used, and licensed by or for the Government for governmental purposes without the payment to me of any royalty thereon.

The invention has an object the simplification of film readers by the elimination of film scanning.

A further object is to provide apparatus to condense a projected image on a film to two lines representing the X and Y coordinate values of the image so that the lengths of the lines are proportional to the X and Y values of the image.

Further objects will become apparent as the description progresses.

In the drawing the single figure is a diagrammatic representation of the invention.

Light source 1 projects primary beams 2 through film 3. Beam splitter 4 reflects a portion of the beams or rays 2′ to parabolic mirror cylinder 5 which compresses or condenses the Y coordinate and reflects it to focal line 6. The X coordinate is not affected and is shown in its full true value. Beams or rays 2″ pass through beam splitter 4 and strike parabolic mirror cylinder 7 which compresses or condenses the X coordinate and reflects it to focal line 8. The Y coordinate is not affected and is shown in its full true value. The axis of mirror 7 is set at an angle of 90° to the axis of mirror 5.

A darkened area or image 9 on film 3 is condensed and projected onto receiver 10 as a dark area 11 along bright focal line 6. The darkened image 9 is also condensed and projected onto receiver 12 as a dark area 13 along bright focal line 8. Sensing devices 14 and 15 may be used to determine the values of the condensed dark areas.

If desired film 3 could be substantially opaque except at area 9 which would be substantially transparent, thus the amount of light passing through area 9 would be proportional to the transparent area and sensors 14 and 15 would sense the values.

Instead of light energy it would be possible to use other forms of electromagnetic energy which can be radiated, divided, reflected to lines of energy, and the values of the lines of energy sensed.

I claim:
1. Apparatus for use in film reading comprising a source of primary energy rays for projection through film, dividing means for dividing the rays into components after passage through film, first condensing means for condensing one component substantially to a first line of condensed rays, a first receiver for the first line of condensed rays, second condensing means for condensing another component substantially to a second line of condensed rays, and a second receiver for the second line of condensed rays.

2. Apparatus as in claim 1 and a substantially transparent film in the path of said source of primary energy rays, said film bearing a darkened image area representing information to be read.

3. Apparatus as in claim 1 and a substantially opaque film in the path of said source of primary energy rays, said film bearing a substantially transparent image area representing information to be read.

4. Apparatus as in claim 1 and a first sensing device located at the first line of condensed rays, and a second sensing device located at the second line of condensed rays, said sensing devices being positioned to receive rays reflected from said condensing means and to sense the presence and magnitude of an image area on said film in the path of said primary energy rays.

5. Apparatus as in claim 1 wherein said dividing means comprises a partially transparent-partially reflecting beam splitter.

6. Apparatus as in claim 1 wherein said first condensing means comprises a first parabolic cylindrical reflector and said second condensing means comprises a second parabolic cylindrical reflector.

7. The method of film reading which comprises passing energy rays through a film splitting said rays into components, condensing one component substantially to a first line, condensing another component substantially to a second line substantially at an angle of 90° to said first line, and reading the values of the condensed components.

References Cited

UNITED STATES PATENTS

| | | | |
|---|---|---|---|
| 2,140,799 | 12/1938 | Kucher. | |
| 2,860,557 | 11/1958 | Moore et al. | 350—294 X |
| 3,104,587 | 9/1963 | Meyerhoefer | 350—294 |
| 3,118,437 | 1/1964 | Hunt | 350—294 |

RALPH G. NILSON, Primary Examiner

C. M. LEEDOM, Assistant Examiner

U.S. Cl. X.R.

350—55, 181; 356—200